(12) United States Patent
Kim et al.

(10) Patent No.: US 11,447,605 B2
(45) Date of Patent: Sep. 20, 2022

(54) TOUCH SENSITIVE DEVICE COMPRISING ELECTROACTIVE FILM, DISPLAY DEVICE COMPRISING THE SAME, AND METHOD OF MANUFACTURING THE ELECTROACTIVE FILM

(71) Applicant: LG DISPLAY CO., LTD., Seoul (KR)

(72) Inventors: Taeheon Kim, Seoul (KR); SuSeok Choi, Seongnam-si (KR); Yong-Su Ham, Seoul (KR); YongWoo Lee, Goyang-si (KR); MyungJin Lim, Goyang-si (KR); Seulgi Choi, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 236 days.

(21) Appl. No.: 14/983,140

(22) Filed: Dec. 29, 2015

(65) Prior Publication Data

US 2016/0185915 A1    Jun. 30, 2016

(30) Foreign Application Priority Data

Dec. 31, 2014  (KR) ........................ 10-2014-0195910
Jun. 18, 2015  (KR) ........................ 10-2015-0086834

(51) Int. Cl.
*G06F 3/041*    (2006.01)
*B32B 27/28*    (2006.01)
(Continued)

(52) U.S. Cl.
CPC ............... *C08G 77/24* (2013.01); *B32B 7/12* (2013.01); *B32B 27/06* (2013.01); *B32B 27/08* (2013.01);
(Continued)

(58) Field of Classification Search
None
See application file for complete search history.

(56) References Cited

U.S. PATENT DOCUMENTS 3,878,274 A * 4/1975 Murayama .......... B29C 47/0004
                                                      264/1.36
2007/0200468 A1* 8/2007 Heim .................. F04B 43/0054
                                                      310/311
(Continued)

FOREIGN PATENT DOCUMENTS

CN        102804104 A     11/2012
EP         2752462 A1      7/2014
(Continued)

OTHER PUBLICATIONS

JI of Fluorine Chemistry 126 pp. 221-229 Amduri (2005).*
(Continued)

*Primary Examiner* — Kenneth J Stachel
(74) *Attorney, Agent, or Firm* — Birch, Stewart, Kolasch & Birch, LLP

(57) ABSTRACT

Provided is a touch sensitive device including an electroactive film, a display device including the same, and a method of manufacturing the electroactive film. The touch sensitive device of the present disclosure includes an electroactive film including a siloxane polymer having a fluoro group or a chloro group bonded to a part of the backbone, and the electroactive film has a dielectric constant that is improved by 15% or more by elongation at an elongation rate of 100% or more.

6 Claims, 8 Drawing Sheets

(51) Int. Cl.

| | | |
|---|---|---|
| *G06F 3/01* | (2006.01) | |
| *B32B 27/06* | (2006.01) | |
| *B32B 27/08* | (2006.01) | |
| *C08G 77/24* | (2006.01) | |
| *C08J 5/18* | (2006.01) | |
| *C09D 183/08* | (2006.01) | |
| *C08L 83/08* | (2006.01) | |
| *C08L 83/00* | (2006.01) | |
| *B32B 7/12* | (2006.01) | |
| *C08K 5/56* | (2006.01) | |
| *C08G 77/20* | (2006.01) | |
| *C08G 77/12* | (2006.01) | |
| *C08G 77/38* | (2006.01) | |

(52) U.S. Cl.
CPC ............... *B32B 27/283* (2013.01); *C08J 5/18* (2013.01); *C08K 5/56* (2013.01); *C08L 83/00* (2013.01); *C08L 83/08* (2013.01); *C09D 183/08* (2013.01); *G06F 3/016* (2013.01); *G06F 3/041* (2013.01); *B32B 2250/05* (2013.01); *B32B 2255/10* (2013.01); *B32B 2255/205* (2013.01); *B32B 2307/20* (2013.01); *B32B 2307/204* (2013.01); *B32B 2307/40* (2013.01); *B32B 2307/516* (2013.01); *B32B 2307/518* (2013.01); *B32B 2307/732* (2013.01); *B32B 2457/20* (2013.01); *B32B 2457/208* (2013.01); *B32B 2590/00* (2013.01); *B32B 2605/00* (2013.01); *C08G 77/12* (2013.01); *C08G 77/20* (2013.01); *C08G 77/38* (2013.01); *C08J 2383/08* (2013.01); *G06F 2203/04102* (2013.01); *G06F 2203/04103* (2013.01)

(56) References Cited

U.S. PATENT DOCUMENTS

| | | | |
|---|---|---|---|
| 2009/0085444 A1* | 4/2009 | Alvarez Icaza Rivera | ................... H01L 41/0478 310/365 |
| 2010/0215968 A1 | 8/2010 | Fields et al. | |
| 2011/0128239 A1* | 6/2011 | Polyakov | ................ G06F 3/016 345/173 |
| 2012/0169184 A1* | 7/2012 | Pelrine | ................... H01L 41/45 310/365 |
| 2013/0236730 A1* | 9/2013 | Bose | ................... H01L 41/0815 428/447 |
| 2013/0338472 A1* | 12/2013 | Macia | ................ A61B 5/04085 600/388 |
| 2014/0183473 A1 | 7/2014 | Lee et al. | |
| 2015/0344671 A1* | 12/2015 | Furukawa | ............... C08L 83/08 310/366 |

FOREIGN PATENT DOCUMENTS

| | | |
|---|---|---|
| JP | 51-46142 A | 4/1976 |
| JP | 2002-530447 A | 9/2002 |
| JP | 2008-511711 A | 4/2008 |
| JP | 2013-115607 A | 6/2013 |
| JP | 2014-112413 A | 6/2014 |
| JP | 2016-126780 A | 7/2016 |
| KR | 10-2012-0119020 A | 10/2012 |
| WO | WO 01/29141 A1 | 4/2001 |
| WO | WO 2014/105959 A1 | 7/2014 |
| WO | WO 2014/192541 A1 | 12/2014 |

OTHER PUBLICATIONS

E-Polymers, vol. 11 issue 1 pp. 1-13 Cui (2011).*
Benjanariu article, Proc. of SPIE vol. 7976 79762V-1 to 79762V-8 (2011).*

* cited by examiner

TOUCH SENSITIVE DEVICE COMPRISING ELECTROACTIVE FILM, DISPLAY DEVICE COMPRISING THE SAME, AND METHOD OF MANUFACTURING THE ELECTROACTIVE FILM

CROSS-REFERENCE TO RELATED APPLICATIONS

This application claims priority from and the benefit under 35 U.S.C. § 119(a) of Korean Patent Application No. 10-2014-0195910 filed on Dec. 31, 2014 and Korean Patent Application No. 10-2015-0086834 filed on Jun. 18, 2015, the contents of which are incorporated by reference herein in their entirety.

BACKGROUND OF INVENTION

Field of the Invention

The present disclosure relates to a touch sensitive device including an electroactive film, a display device including the same, and a method of manufacturing the electroactive film. More specifically, the present disclosure relates to a touch sensitive device including an electroactive film with an excellent dielectric constant and an excellent light transmittance, a display device including the same, and a method of manufacturing the electroactive film.

Description of the Related Art

Recently, users have demanded a touch type display device to easily input information by touching various display devices such as a liquid crystal display device and an organic light emitting display device. Accordingly, continued research has been carried out to utilize a haptic device in order to provide direct and various touch feedback to the users. It is particularly difficult to provide immediate and fine feedback to a user's touch since conventional haptic devices are attached to the back of the display panel. Hence, research has been actively conducted in order to provide sensitive, various, and direct feedback to a user's touch by positioning the haptic device in the front of the display panel. Moreover, recent research on the direct and various movements of the display device has been conducted using the haptic device together with a flexible display device that has also been actively developed.

Conventionally, a vibratory motor such as an eccentric rotating mass (ERM) or a linear resonant actuator (LRA) is used in the display device such as a haptic device. The vibratory motor is designed so that the whole display device vibrates. Thus, a problem arises in that a massive vibratory motor is required in order to increase the intensity of vibration. The vibratory motor also has the disadvantage in that frequency modulation required to control the degree of vibration is difficult, and thus, the response time is significantly long. Accordingly, the vibratory motor is not suitable for use in a flexible display device.

In order to solve the problems described above, a shape memory alloy (SMA) and an electroactive ceramics (EAC) have been developed as materials of the haptic device. However, it is difficult to apply these materials to the display device, especially a flexible display device, since the shape memory alloy (SMA) has a long response time, a short lifespan and an opaque property. Also, the electroactive ceramics (EAC) are fragile.

Accordingly, in recent years, haptic technology using an electroactive polymer (EAP) has attracted the attention of the public. The electroactive polymer is a polymer that can be deformed by electrical stimulation and refers to a polymer that can be repeatedly expanded, contracted, and bended by electrical stimulation. A ferroelectric polymer and a dielectric elastomer are mainly used among various kinds of electroactive polymers. Examples of the ferroelectric polymer may include PVDF (PolyVinyliDene Fluoride) and P (VDF-TrFE) (Poly(VinyliDene Fluoride)-TriFluoroEtylene). Examples of the dielectric elastomer may include a silicone-based polymer, a urethane-based polymer, and an acrylic-based polymer.

Although the ferroelectric polymer has an excellent dielectric constant and an excellent intensity of vibration at low voltage, it is difficult to use the ferroelectric polymer in the front of a display device since the ferroelectric polymer is significantly inferior in light transmittance and optical properties. On the other hand, while the dielectric elastomer exhibits excellent light transmittance and optical properties, it is difficult to use the dielectric elastomer in a display device such as a mobile display provided with a relatively low voltage since the dielectric elastomer has a relatively low dielectric constant compared to the ferroelectric polymer, and thus, requires a high driving voltage.

SUMMARY OF INVENTION

As described above, the inventors of the present disclosure have understood that conventional dielectric elastomers are difficult for use in a display device such as a mobile display since it requires a high driving voltage, and conventional ferroelectric polymers are difficult for use in the front of the display device since they have a low light transmittance. Accordingly, the inventors of the present disclosure have developed a touch sensitive device including an electroactive film composed of a siloxane polymer that has an excellent dielectric constant and an excellent light transmittance.

Therefore, an object to be achieved by the present disclosure is to provide a touch sensitive device including an electroactive film that has the properties of both a ferroelectric polymer and a dielectric elastomer, and a display device including the same.

Another object to be achieved by the present disclosure is to provide a touch sensitive device which requires a low driving voltage and has an improved intensity of vibration by using an electroactive film that has a high dielectric constant, and a display device including the same.

Another object to be achieved by the present disclosure is to provide a touch sensitive device capable of being disposed in the front of the display panel by using an electroactive film that has an excellent light transmittance, and a display device including the same.

The object of the present disclosure is not limited to the above-mentioned objects, and other objects which are not mentioned here will be clearly understood by those skilled in the art from the following description.

A touch sensitive device according to an embodiment of the present disclosure is provided in order to achieve an object of the invention as described above. The touch sensitive device includes an electroactive film composed of a siloxane polymer having a fluoro group or a chloro group bonded to a part of the backbone, and the electroactive film has a dielectric constant that is improved by 15% or more by elongation at an elongation rate of 100% or more.

According to another embodiment of the present disclosure, the electroactive film has a dielectric constant that may be improved by 30% or more by elongation at an elongation rate of 300% or more.

According to still another embodiment of the present disclosure, the siloxane polymer may be produced by (i) or (ii) below: (i) crosslinking a polysiloxane having terminals substituted with a vinyl group with a silicon-based crosslinker having a fluoro group or a chloro group bonded to a part of the backbone, or (ii) crosslinking a polydimethylsiloxane PDMS having terminals substituted with a vinyl group with a silicon-based crosslinker having a hydrogen atom, or a hydroxyl group at the backbone and then substituting the hydrogen atom or the hydroxyl group with a fluoro group or a chloro group.

According to still another embodiment of the present disclosure, the electroactive film may be uniaxially or biaxially elongated.

According to still another embodiment of the present disclosure, the electroactive film may have a β-phase structure.

According to still another embodiment of the present disclosure, the electroactive film may have a multilayer structure in which a ferroelectric polymer region and a dielectric elastomer region are stacked layer by layer.

According to still another embodiment of the present disclosure, the electroactive film may have a dielectric constant measured at 1 kHz of 7.0 or more.

According to still another embodiment of the present disclosure, the electroactive film may have a light transmittance of 85% or more.

A display device according to another embodiment of the present disclosure is provided in order to achieve an object of the invention as described above. The display device includes a display panel, a touch panel, and a touch sensitive device. The touch sensitive device includes an electroactive film composed of a siloxane polymer having a fluoro group or a chloro group bonded to a part of the backbone, and the electroactive film has a dielectric constant that is improved by 15% or more by elongation at an elongation rate of 100% or more.

According to still another embodiment of the present disclosure, the electroactive film is uniaxially or biaxially elongated.

A method of manufacturing an electroactive film according to still another embodiment of the present disclosure is provided in order to achieve an object of the invention as described above. The method of manufacturing an electroactive film includes the steps of crosslinking a polysiloxane represented by the following Chemical Formula 1 with a silicon-based crosslinker represented by the following Chemical Formula 2 to produce a siloxane polymer; substituting some hydrogen atoms or hydroxyl groups bonded to the backbone of the produced siloxane polymer with a fluoro group or a chloro group to form a substituted siloxane polymer; and forming the substituted siloxane polymer into a film.

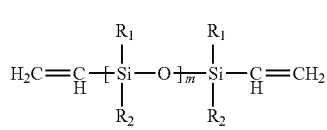

[Chemical Formula 1]

In Chemical Formula 1, $R_1$ and $R_2$ is each independently a $C_1$ to $C_{20}$ alkyl group, a $C_1$ to $C_{20}$ aryl group, a $C_1$ to $C_{20}$ cycloalkyl group or a hydrogen atom, and m is an integer of 1 or more.

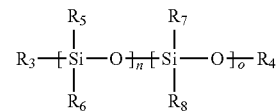

[Chemical Formula 2]

In Chemical Formula 2, $R_3$ to $R_7$ is each independently a $C_1$ to $C_{20}$ alkyl group, a $C_1$ to $C_{20}$ aryl group, a $C_1$ to $C_{20}$ cycloalkyl group or a hydrogen atom, $R_8$ is a hydrogen atom or a hydroxyl group, n is 0 or an integer of 1 or more, and o is an integer of 2 or more.

A method of manufacturing an electroactive film according to still another embodiment of the present disclosure is provided in order to achieve an object of the invention as described above. The method of manufacturing an electroactive film includes substituting some hydrogen atoms or hydroxyl groups bonded to the backbone of a silicon-based crosslinker represented by the following Chemical Formula 2 with a fluoro group or a chloro group; crosslinking a polysiloxane represented by the following Chemical Formula 1 with the substituted silicon-based crosslinker to produce a siloxane polymer; and forming the produced siloxane polymer into a film.

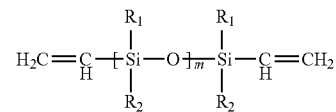

[Chemical Formula 1]

In Chemical Formula 1, $R_1$ and $R_2$ is each independently a $C_1$ to $C_{20}$ alkyl group, a $C_1$ to $C_{20}$ aryl group, a $C_1$ to $C_{20}$ cycloalkyl group or a hydrogen atom, and m is an integer of 1 or more.

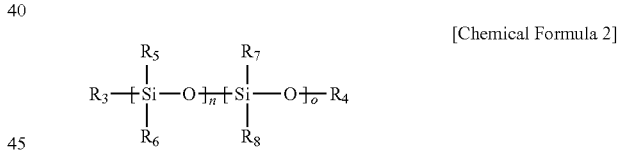

[Chemical Formula 2]

In Chemical Formula 2, $R_3$ to $R_7$ is each independently a $C_1$ to $C_{20}$ alkyl group, a $C_1$ to $C_{20}$ aryl group, a $C_1$ to $C_{20}$ cycloalkyl group or a hydrogen atom, $R_8$ is a hydrogen atom or a hydroxyl group, n is 0 or an integer of 1 or more, and o is an integer of 2 or more.

According to another embodiment of the present disclosure, the volume ratio of the polysiloxane represented by Chemical Formula 1 to the silicon-based crosslinker represented by Chemical Formula 2 to be crosslinked is from 9:1 to 5:5.

According to still another embodiment of the present disclosure, the method of manufacturing an electroactive film further includes uniaxially or biaxially elongating the formed electroactive film.

The present disclosure provides a touch sensitive device including an electroactive film composed of a siloxane polymer having the properties of both a ferroelectric polymer and a dielectric elastomer.

The present disclosure also provides a touch sensitive device which requires a low driving voltage and has an improved intensity of vibration using an electroactive film that has a high dielectric constant.

The present disclosure also provides a manufacturing process for a touch sensitive device capable of being disposed on the upper part of the display panel using an electroactive film that has an excellent light transmittance that delivers direct tactile feedback to the user.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

DETAILED DESCRIPTION OF INVENTION

Figure 1:
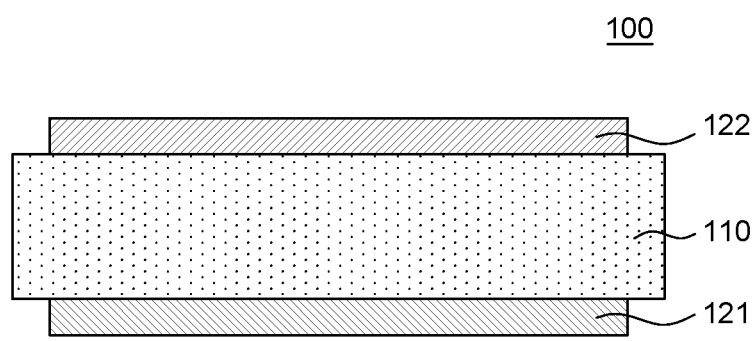
FIG. 1 is a schematic cross-sectional diagram illustrating the structure of a touch sensitive device according to an embodiment of the present disclosure.

Various advantages and features of the present disclosure and methods accomplishing thereof will become apparent from the following description of embodiments with reference to the accompanying drawings. However, the present disclosure is not limited to exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims.

The term "component" includes a margin of error.

The phrase "positional relationship" used in the context of between two parts, e.g., with the phrases "on", "at the upper part of", "at the lower part of", and "next to") refers to one or more other parts that may be positioned between the two parts, unless the phrase "immediately" or "directly" is used.

Although "first", "second", and the like are used in order to describe various components, the components are not limited by these terms. The above terms are used only to distinguish one component from the other component. Therefore, a first component mentioned below may be a second component within the technical spirit of the present disclosure.

The same reference numerals indicate the same elements throughout the specification.

In the drawings, size and thickness of each element are arbitrarily illustrated for convenience of description, and the present disclosure is not necessarily limited to those illustrated in the drawings.

The components of various embodiments of the present disclosure can be partially or entirely bonded to or combined with each other and can be interlocked and operated in various ways as can be fully understood by an ordinary person skilled in the art, and the embodiments can be carried out independently or in association with each other.

As used herein, the "electroactive film" refers to a film which can deliver a sense of vibration by contracting and expanding when a voltage is applied thereto.

As used herein, the "touch sensitive device" refers to a device that can deliver tactile feedback to the user in response to the user's touch with respect to the touch sensitive device.

Hereinafter, various embodiments of the present disclosure will be described in detail with reference to the accompanying drawings.

As used herein, the symbol "*" denotes the portion at which the same or different repeating units or Chemical Formulas are bonded to each other.

FIG. 1 is a schematic cross-sectional diagram illustrating the structure of a touch sensitive device according to an embodiment of the present disclosure. As illustrated in FIG. 1, a touch sensitive device 100 according to an embodiment of the present disclosure includes an electroactive film 110, a first electrode (121) disposed at lower part of the electroactive film 110, and a second electrode (122) disposed at the upper part of the electroactive film (110).

The electroactive film (110) is disposed between the first electrode (121) and the second electrode (122), and serves to vibrate or bend by electric stimulation. The electroactive film (110) is composed of a siloxane polymer of a polymer exhibiting electroactivity, and specifically is composed of a siloxane polymer having a fluoro group or a chloro group bonded to a part of the backbone.

The siloxane polymer constituting the electroactive film (110) of the present disclosure has a structure in which a fluoro group or a chloro group, which is highly electronegative, is bonded to the backbone of the siloxane polymer. Thus, a polarization phenomenon occurs in the electroactive film (110). As a result, the electroactive film (110) has a dielectric constant that is improved.

The siloxane polymer of the present disclosure has a structure similar to a film composed of a polysiloxane used as a conventional dielectric elastomer, and thus, has an excellent light transmittance and optical properties. However, the siloxane polymer of the present disclosure also has the properties of a ferroelectric polymer since a fluoro group or a chloro group is bonded to some Si constituting the backbone. More specifically, the Si—F dipole or the Si—Cl dipole of the siloxane polymer is selectively arranged in the direction to which the electric field is applied when an external electric field that has a particular intensity is applied to the electroactive film (110), and thus, the intensity of polarization of the electroactive film (110) is improved. In addition, remanent polarization occurs because the Si—F dipole or the Si—Cl dipole does not return to its original state even though the external electric field is removed. In other words, the siloxane polymer of the present disclosure has properties similar to a ferroelectric polymer such as polyvinylidene fluoride (PVDF). Thus, the siloxane polymer of the present disclosure has a higher dielectric constant compared to a conventional dielectric elastomer.

Meanwhile, the siloxane polymer that has a fluoro group or a chloro group bonded to a part of the backbone of the present disclosure may be produced by crosslinking a polysiloxane having terminals substituted with a vinyl group with a silicon-based crosslinker. The fluoro group or the chloro group bonded to the backbone of the obtained siloxane polymer is present in the repeating unit derived from the backbone of the silicone-based crosslinker. More specifically, the siloxane polymer that has a fluoro group or a chloro group bonded to the backbone may be produced by (i) or (ii) below: (i) crosslinking a polysiloxane having terminals substituted with a vinyl group with a silicon-based crosslinker having a hydrogen atom or a hydroxyl group at the backbone and then substituting the hydrogen atom or the hydroxyl group with a fluoro group or a chloro group, or (ii) crosslinking a polysiloxane having terminals substituted with a vinyl group with a silicon-based crosslinker having a fluoro group or a chloro group bonded to a part of the backbone.

The polysiloxane that has terminals substituted with a vinyl group has properties of a conventional dielectric elastomer, and thus, imparts the properties of a dielectric elastomer to the siloxane polymer of the present disclosure. In addition, the fluoro group or the chloro group bonded to a part of the backbone is highly electronegative. Thus, the intensity of polarization of the siloxane polymer of the present disclosure is improved and the dielectric constant thereof is improved.

More specifically, the siloxane polymer that has a fluoro group or a chloro group bonded to a part of the backbone may be produced by crosslinking a polysiloxane that is represented by the following Chemical Formula 1 and has terminals substituted with a vinyl group with a silicon-based crosslinker represented by the following Chemical Formula 2, and then substituting some hydrogen atoms of Si—H or some hydroxyl groups of Si—OH present in the backbone of the repeating unit derived from the silicon-based crosslinker represented by Chemical Formula 2 with a fluoro group or a chloro group.

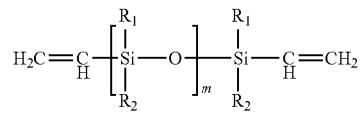

[Chemical Formula 1]

In Chemical Formula 1, $R_1$ and $R_2$ is each independently a $C_1$ to $C_{20}$ alkyl group, a $C_1$ to $C_{20}$ aryl group, a $C_1$ to $C_{20}$ cycloalkyl group or a hydrogen atom, and m is an integer of 1 or more. In Chemical Formula 1, $R_1$ and $R_2$ are preferably a $C_1$ to $C_{20}$ alkyl group and more preferably a methyl group, m is preferably an integer from 50 to 500, but they are not limited thereto.

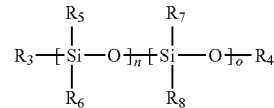

[Chemical Formula 2]

In Chemical Formula 2, $R_3$ to $R_7$ is each independently a $C_1$ to $C_{20}$ alkyl group, a $C_1$ to $C_{20}$ aryl group, a $C_1$ to $C_{20}$ cycloalkyl group or a hydrogen atom, $R_8$ is a hydrogen atom or a hydroxyl group, n is 0 or an integer of 1 or more, and o is an integer of 2 or more. It is preferable that n is 0 and o is an integer from 10 to 100, but they are not limited thereto.

Specific examples of the alkyl group may include a methyl group, an ethyl group, a propyl group, a butyl group, a sec-butyl group, a tert-butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, an octadecyl group, a nonadecyl group, an eicosyl group, heneicosyl group, and a docosyl group. In addition, specific examples of the aryl group may include a phenyl group, a tolyl group, a biphenyl group, o- , m- , p-terphenyl groups, a naphthyl group, an anthracenyl group, a phenanthrenyl group, a 9-phenylanthracenyl group, a 9,10-diphenylanthracenyl group, and a pyrenyl group. In addition, specific examples of the cycloalkyl group may include a cyclopentyl group, a cyclohexyl group, a norbornyl group, an adamantyl group, and a 4-methylcyclohexyl group.

In addition, the siloxane polymer of the present disclosure may be produced by substituting hydrogen atoms or hydroxyl groups present in the backbone of a silicon-based crosslinker represented by Chemical Formula 2 with a fluoro group or a chloro group to produce a silicon-based crosslinker having Si—F or Si—Cl in the backbone, and then crosslinking a polysiloxane that is represented by Chemical Formula 1 and has terminals substituted with a vinyl group with the silicon-based crosslinker having a fluoro group or a chloro group bonded to the backbone.

The siloxane polymer of the present disclosure is preferably a copolymer having a network structure. The siloxane polymer produced by the method described above is produced by crosslinking a polysiloxane having terminals substituted with a vinyl group with a silicon-based crosslinker. At this time, the vinyl group present in the terminal portion of the polysiloxane reacts with Si—H or Si—OH present in the backbone of the silicon-based crosslinker to be crosslinked with each other in the vertical direction. Consequently, the polysiloxane that has terminals substituted with a vinyl group and the silicon-based crosslinker are two-dimensionally linked with each other in order to have a continuous network structure, but not a linear structure. The polysiloxane is not particularly limited, but specific examples thereof may include a siloxane polymer represented by the following Chemical Formula 3.

group or the chloro group is arranged in the same direction as the backbone of the siloxane polymer is elongated. When the fluoro group or the chloro group is arranged in the same direction, polarization also occurs in the same direction. Thus, the intensity of polarization of the siloxane polymer is further improved and the dielectric constant of the electroactive film (110) is significantly improved.

[Chemical Formula 3]

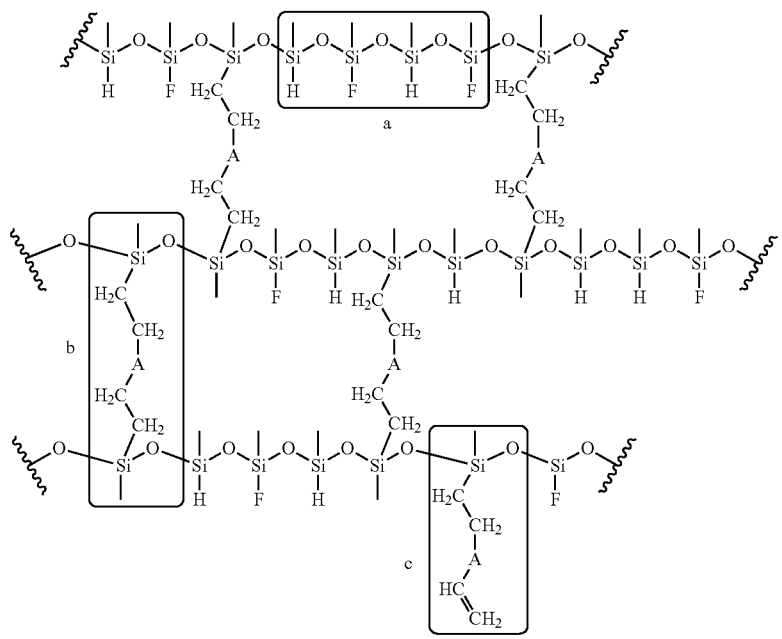

In Chemical Formula 3, A represents

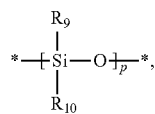

$R_9$ and $R_{10}$ is each independently a $C_1$ to $C_{20}$ alkyl group, a $C_1$ to $C_{20}$ aryl group, a $C_1$ to $C_{20}$ cycloalkyl, or a hydrogen atom, and p is an integer of 1 or more. $R_9$ and $R_{10}$ in A are preferably a $C_1$ to $C_{20}$ alkyl group and more preferably a methyl group, p is preferably an integer from 50 to 500, but they are not limited thereto.

In Chemical Formula 3, a represents an example of the repeating unit derived from a silicon-based crosslinker, and b and c represent examples of the repeating unit derived from a polysiloxane that has terminals substituted with a vinyl group. As shown in Chemical Formula 3, the siloxane polymer of the present disclosure has a network structure.

Figure 2:
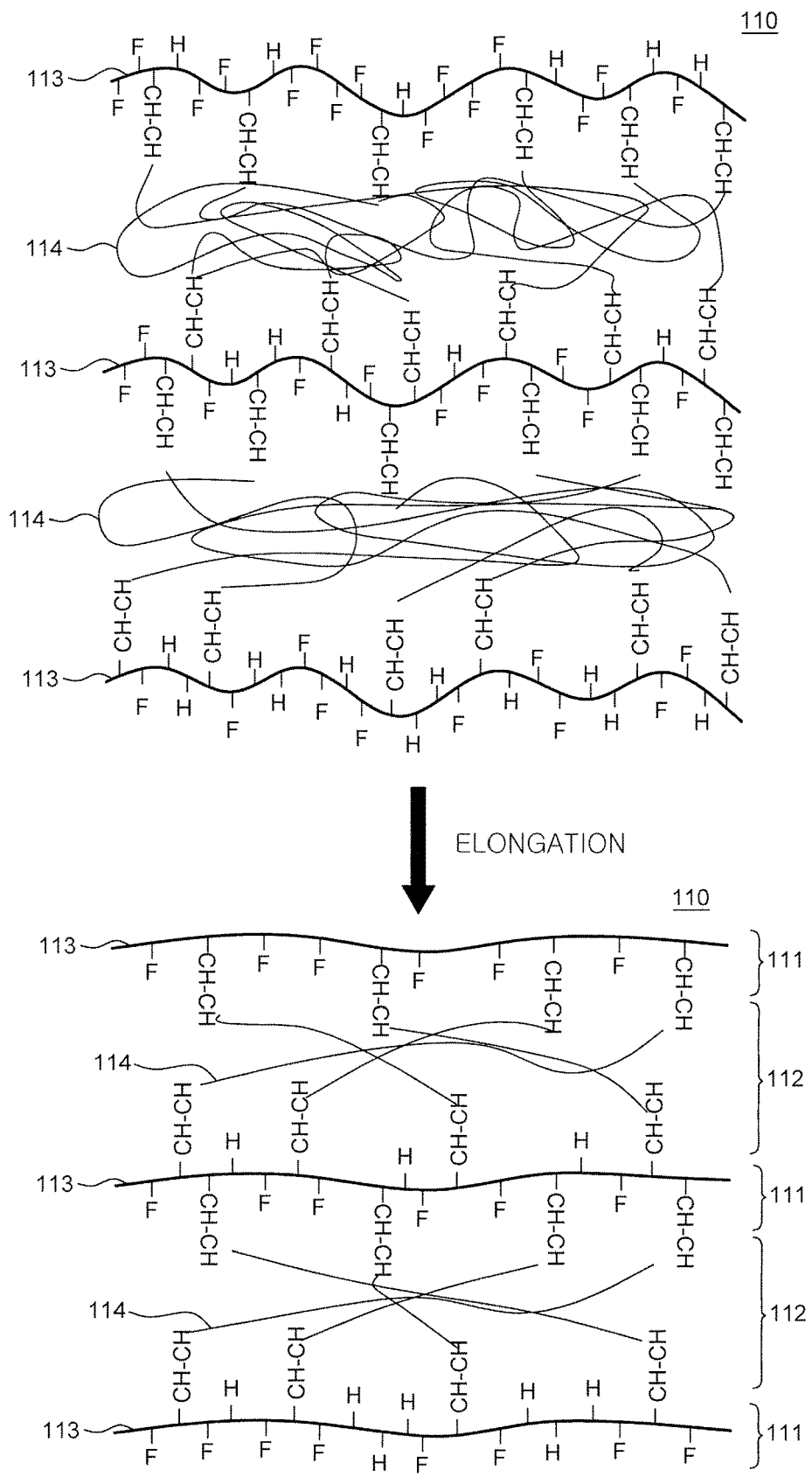
FIG. 2 is a diagram illustrating the crystal structure of a siloxane polymer before and after an elongation process used in the present disclosure.

Meanwhile, the electroactive film (110) composed of the siloxane polymer having a fluoro group or a chloro group bonded to a part of the backbone may be an elongated film. The electroactive film (110) is not particularly limited, but may be uniaxially or biaxially elongated in the MD direction (longitudinal direction) or the TD direction (width direction) and may be elongated at an elongation rate of from 100% to 500%. In the case of elongating the electroactive film (110) composed of the siloxane polymer having a fluoro group or a chloro group bonded to a part of the backbone, the fluoro More specifically, the siloxane polymer of the present disclosure may have various crystal structures depending on the conditions. As illustrated in FIG. 2, the crystal structure is shown of a siloxane polymer that has a fluoro group or a chloro group bonded to a part of the backbone before and after elongation, and the non-elongated electroactive film has an α-phase. The α-phase refers to a state in which the fluoro groups or the chloro groups are in a mixed form of a trans form and a gauche form depending on the backbone, and thus, the intensity of polarization of the polymer is low. In addition, the fluoro groups or the chloro groups are arranged to face each other in the crystal lattice. Thus, the total intensity of polarization of the α-phase is canceled, and an improvement in the dielectric constant of the electroactive film is limited.

However, as illustrated in FIG. 2, when the electroactive film is elongated, the steric hindrance between the fluoro groups or the chloro groups bonded to the backbone of the siloxane polymer is greatly eliminated, and a β-phase in which the fluoro groups or the chloro groups are all in a trans configuration may be formed. In other words, the fluoro groups or the chloro groups are arranged in the same direction in the crystal lattice, and thus, the intensity of polarization of the electroactive film is at its highest. Consequently, the structure of the elongated electroactive film is changed from an α-phase to a β-phase. As a result, the dielectric constant of the electroactive film composed of a siloxane polymer may be further improved.

Meanwhile, the electroactive film of the present disclosure may be subjected to a polling process to arrange atoms having a specific charge in one direction by applying a high direct current voltage to a polymer together with the elongation process. The polarization direction of the electroactive film may be uniformly formed through the polling process.

Moreover, as illustrated in FIG. 2, when the electroactive film (110) of the present disclosure is elongated, a region exhibiting the properties of a ferroelectric polymer (111) and a region exhibiting the properties of a dielectric elastomer (112) are separately formed, and these two regions are stacked layer by layer to form a structure. The ferroelectric polymer region (111) includes a silicon-based crosslinker (113), while the dielectric elastomer region (112) includes a a siloxane polymer (114).

More specifically, as illustrated in FIG. 2, the electroactive film before elongation forms a structure like an α-phase in which the backbone to which a fluoro group or a chloro group is bonded is an irregular curve and the fluoro groups or the chloro groups are arranged in random directions. However, the electroactive film after elongation is leveled by the attractive force. Thus, the backbone to which a fluoro group or a chloro group is bonded forms a line close to a straight line, and the fluoro groups or the chloro groups are arranged in the same direction as described above. Consequently, the backbone to which a fluoro group or a chloro group is bonded has a structure similar to a ferroelectric polymer such as a conventional PVDF-based polymer and forms a ferroelectric polymer region. Meanwhile, the polymer which links the backbones of the siloxane polymer to each other has a structure similar to a conventional dielectric elastomer and forms a dielectric elastomer region. Finally, a multilayer structure in which the ferroelectric polymer region and the dielectric elastomer region are stacked layer by layer is formed by elongating the electroactive film.

As described above, when the electroactive film (110) has a β-phase structure or forms a multilayer structure in which the ferroelectric polymer region and the dielectric elastomer region are stacked layer by layer, the electroactive film (110) simultaneously has properties of a dielectric elastomer and a ferroelectric polymer. Thus, the electroactive film (110) has an improved light transmittance, which is a problem of a conventional ferroelectric polymer, and a significantly improved dielectric constant, which is a problem of a dielectric elastomer.

As described above, the dielectric constant of the electroactive film (110) of the present disclosure is improved by elongation. Specifically, the dielectric constant of the electroactive film (110) is improved by 15% or more or 20% or more, and preferably 30% or more by elongation at an elongation rate of 100% or more. The atomic arrangement of the fluoro groups or the chloro groups bonded to the backbone of the siloxane polymer is more uniform as the draw ratio increases. Thus, the intensity of polarization of the electroactive film (110) is improved and the dielectric constant of the electroactive film (110) is further improved. Specifically, the dielectric constant of the electroactive film (110) is improved by 30% or more or 40% or more and preferably 50% or more by elongation at an elongation rate of 300% or more. As described above, the electroactive film (110) of the present disclosure is formed of a siloxane polymer similar to a polydimethylsiloxane (PDMS) used as a conventional dielectric elastomer, but exhibits a significantly improved dielectric constant by elongation since Si—F or Si—Cl is bonded to the backbone of the siloxane polymer.

The electroactive film (110) of the present disclosure exhibits an excellent dielectric constant. The dielectric constant is measured at 1 kHz under a condition of 25° C. is 5.0 or more, and preferably 7.0 or more. The polydimethylsiloxane (PDMS), which is the most widely used dielectric elastomer, has a dielectric constant of about from 2.5 to 3.0. However, the electroactive film (110) of the present disclosure has a dielectric constant of 7.0 or more, and the dielectric constant increases to 8.0 or more or 10.0 or more when the electroactive film (110) is elongated. It is possible to improve the intensity of vibration of the touch sensitive device and to lower the driving voltage therefor when the dielectric constant of the electroactive film (110) satisfies the above range.

In addition, the light transmittance of the electroactive film (110) of the present disclosure is preferably 85% or more, and more preferably 90% or more. In general, the touch sensitive device is required to have a light transmittance of 80% or more in order to be disposed in the front of a display panel. In particular, a ferroelectric polymer such as PVDF (PolyVinyliDene Fluoride) or P (VDF-TrFE) (Poly (VinyliDene Fluoride)-TriFluoroEtylene) that is electroactive generally has a light transmittance of 75% or less, and thus, is hardly positioned in the front of the display panel. However, the electroactive film (110) of the present disclosure has properties of both a ferroelectric polymer and a dielectric elastomer, and thus, functions as a touch sensitive device that has both an excellent light transmittance and an excellent dielectric constant.

The thickness of the electroactive film (110) of the present disclosure is preferably from 10 to 500 μm, and even more preferably from 20 to 200 μm. The touch sensitive device (100) may achieve a strong intensity of vibration when the thickness of the electroactive film (110) satisfies the above range.

A first electrode (121) and a second electrode (122) are attached to both surfaces of the electroactive film (110) as a power supply. Specifically, in FIG. 1, the electrode disposed on the lower surface of the electroactive film (110) is illustrated as the first electrode (121) and the electrode disposed on the upper surface of the electroactive film (110) is illustrated as the second electrode (122).

The first electrode (121) and the second electrode (122) may be formed of a conductive material. The electrodes are not particularly limited, but may be formed, for example, of a metal material such as gold (Au), copper (Cu), titanium (Ti), chromium (Cr), molybdenum (Mo), aluminum (Al), or an aluminum-copper alloy (Al-Cu alloy), or may be composed of a conductive polymer such as PEDOT [Poly(3,4-EthyleneDiOxyThiophene)]:PSS [Poly(4-StyreneSulfonic acid)], polypyrrole, or polyaniline. In addition, the first electrode (121) and the second electrode (122) may consist of a soft electrode produced by mixing an elastic body with carbon conductive grease, carbon black, or carbon nanotube (CNT) so as to be suitable for smooth and repeated driving of the touch sensitive device (100). The first electrode (121) and the second electrode (122) may be composed of the same or different materials.

Meanwhile, when disposing the touch sensitive device (100) of the present disclosure on the display panel, it is preferable that the first electrode (121) and the second electrode (122) include a transparent conductive material in order to secure the transparency of the touch sensitive device. The transparent conductive material is not particularly limited, but it may be selected from the group consisting of indium tin oxide (ITO), graphene, metallic nanowire, and a transparent conductive oxide (TCO).

The first electrode (121) and the second electrode (122) are disposed on both surfaces of the electroactive film (110) by various methods. For example, the first electrode (121)

and the second electrode (122) may be disposed on both surfaces of the electroactive film (110) by a method such as sputtering, printing, or slit coating. The first electrode (121) and the second electrode (122) maybe disposed at the same time, particularly when the first electrode (121) and the second electrode (122) are composed of the same material.

The first electrode (121) and the second electrode (122) form an electric field when a voltage is applied from the outside. Voltages having varying strengths or voltages having opposite electrical properties may be applied to the first electrode (121) and the second electrode (122), respectively, in order to form an electric field in the electroactive film (110). For example, a negative (−) voltage or a ground voltage may be applied to the second electrode (122) when a positive (+) voltage is applied to the first electrode (121), and a positive (+) voltage or a ground voltage may be applied to the second electrode (122) when a negative (−) voltage is applied to the first electrode (121). The direction of the electric field also changes as the electrical properties of the voltage applied to the first electrode (121) and the electrical properties of the voltage applied to the second electrode (122) are reversed.

The voltage applied to the first electrode (121) and the second electrode (122) may be an alternating current (AC) voltage or a direct current (DC) voltage. The electroactive film (110) may be periodically displaced to have an effect of vibration when an alternating current (AC) voltage is applied to the first electrode (121) and the second electrode (122) A bent state of the electroactive film (110) may be maintained when a direct current (DC) voltage is applied to the first electrode (121) and the second electrode (122).

The touch sensitive device (100) of the present disclosure uses an electroactive film (110) which is composed of a siloxane polymer having a fluoro group or a chloro group bonded to a part of the backbone and exhibits an excellent dielectric constant. As the touch sensitive device (100) of the present disclosure, the non-elongated electroactive film may be used or the elongated electroactive film may be used in accordance with the user's needs.

In other words, both the non-elongated electroactive film and the elongated electroactive film have a much higher dielectric constant compared to a conventional dielectric elastomer used as an electroactive polymer, and thus, it is possible to improve the intensity of vibration of the touch sensitive device (100) while lowering the driving voltage.

As described above, when the electroactive film (110) of the present disclosure is elongated, a hybrid polymer including a ferroelectric polymer region and a dielectric elastomer region is partly formed simultaneously, and thus, the properties of the ferroelectric polymer and the dielectric elastomer are exerted at the same time. More specifically, the ferroelectric polymer region including a fluoro group and a chloro group, which are highly electronegative, delivers power to the touch sensitive device (100) as the arrangement direction of the dipole in the ferroelectric polymer region changes when an electric field is applied to the electroactive film (110). On the other hand, the dielectric elastomer region is a region in which a great number of polysiloxane chains are formed. Thus, the dielectric elastomer region is contracted and expanded by the Coulombic force to deliver power to the touch sensitive device (100) when voltage is applied to the electroactive film (110).

Figure 3:
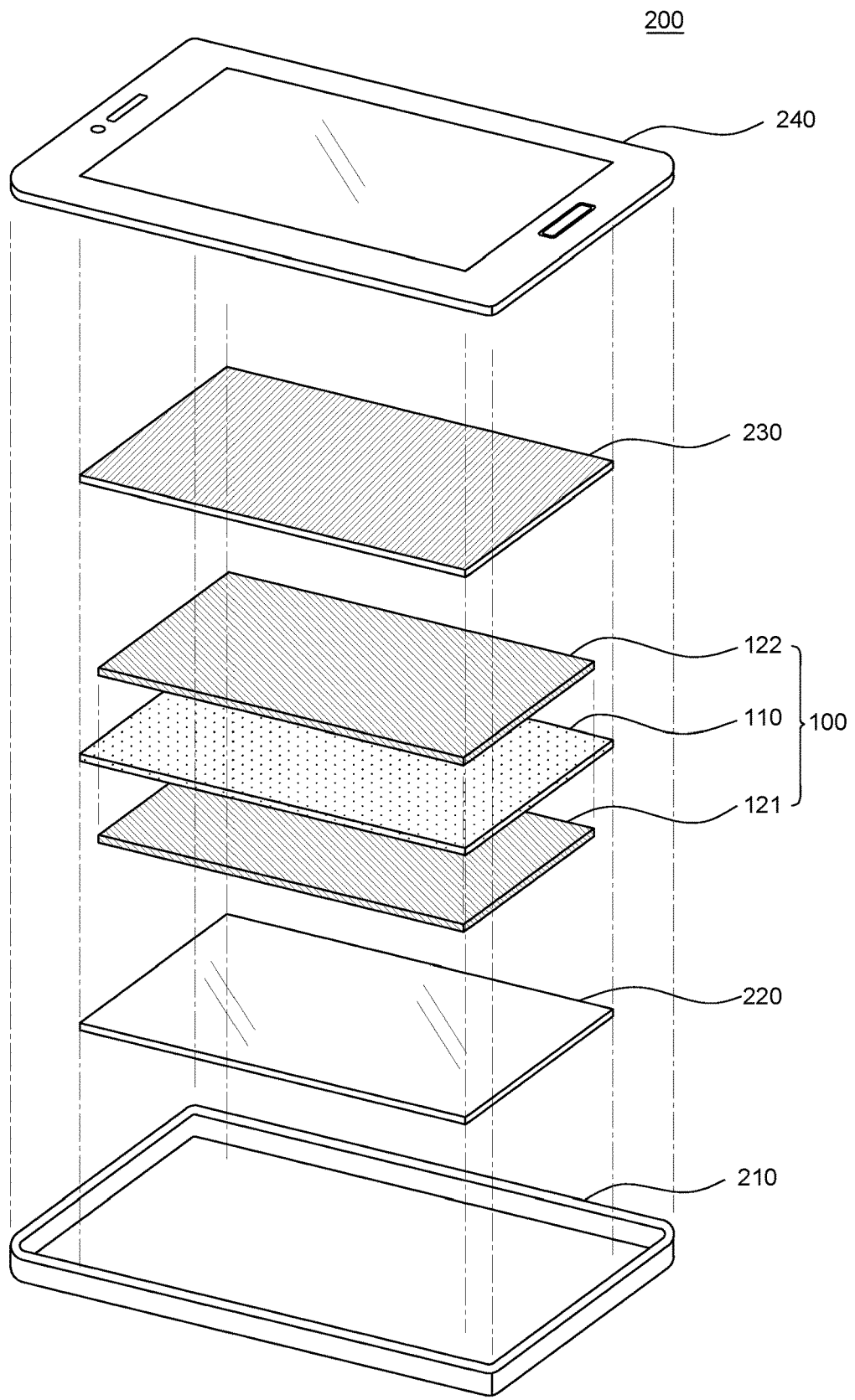
FIG. 3 is a schematic exploded perspective diagram illustrating the structure of a display device including a touch sensitive device according to an embodiment of the present disclosure.

FIG. 3 is a schematic exploded perspective diagram illustrating the structure of a display device (200) including the touch sensitive device (100) according to an embodiment of the present disclosure. As illustrated in FIG. 3, the display device (200) according to an embodiment of the present disclosure includes a lower cover (210), a display panel (220), the touch sensitive device (100), a touch panel (230), and an upper cover (240).

The lower cover (210) is disposed below the display panel (220) in order to cover the lower part of the display panel (220), the touch sensitive device (100), and the touch panel (230). The lower cover (210) protects the internal components of the display device (200) from external impact and penetration of foreign matters or moisture. The lower cover (210) is not particularly limited, but may be composed of, for example, a material such as a plastic which is capable of being heat molded and exhibits favorable processability. In addition, the lower cover (210) may be composed of a material that may be deformed in accordance with the shape change of the display device (200), with actively developing of a flexible display device. For example, the lower cover (210) may be composed of a flexible material such as a plastic.

The display panel (220) refers to a panel in which a display device for displaying an image is disposed in the display device (200). The display panel (220) is not particularly limited, and various display panels may be used, for example, an organic light emitting display panel, a liquid crystal display panel, and an electrophoretic display panel. The display panel (220) may be preferably an organic light emitting display device. The organic light emitting display device is a display device in which the organic light emitting layer emits light as a current flows through the organic light emitting layer. Light of a specific wavelength is emitted depending on the organic light emitting layer used. The organic light emitting display device at least includes a cathode, an organic light emitting layer, and an anode.

The organic light emitting display device may be configured in order to be flexible and capable of being deformed. In other words, the organic light emitting display device is an organic light emitting display device that exhibits flexibility and includes a flexible substrate. The flexible organic light emitting display device may be deformed in various directions and at various angles by the force applied from the outside.

The touch sensitive device (100) maybe disposed at the lower part of the display panel (220) or may be disposed on the upper part of the display panel (220), if necessary. In FIG. 3, the touch sensitive device (100) is disposed on the upper part of the display panel (220). Specifically, the touch sensitive device (100) may be disposed in order to be in direct contact with the upper surface of the display panel (220), or may be disposed in order to interpose an adhesive between the upper surface of the display panel (220) and the lower surface of the touch sensitive device (100). The adhesive is not particularly limited, but an OCA (optical clear adhesive) or OCR (optical clear resin) may be used.

The touch sensitive device (100) illustrated in FIG. 3 includes the first electrode (121), the second electrode (122), and the electroactive film (110). The specific components of the touch sensitive device (100) are the same as the touch sensitive device (100) described in FIG. 1, and thus a detailed description thereon will be omitted.

The touch sensitive device (100) may be electrically connected to the display panel (220). For example, the Flexibile Printed Circuit Board (FPCB) disposed in the display panel (220) and the electrode of the touch sensitive device (100) may be electrically connected to each other by wiring.

A touch panel (230) is disposed on the touch sensitive device (100). The touch panel (230) refers to a panel for performing a function to perceive the touch input by the user with respect to the display device (200) and to provide the touch coordinate.

The touch panel (230) may be divided depending on the position disposed. For example, an Add-On touch panel may be used in which the touch panel (230) is attached to the upper surface of the display panel (220). In another embodiment, an On-Cell touch panel may be used in which the touch panel (230) is deposited on the display panel (220). In yet another embodiment, an In-Cell touch panel may be used in which the touch panel (230) is formed in the display panel (220). In addition, the touch panel (230) may also be divided depending on the operating system. For example, a capacitive touch panel, a resistive touch panel, an ultrasonic touch panel, and an infrared touch panel may be used, but a capacitive touch panel may be preferably used as the touch panel (230).

In addition, the touch panel (230) may be electrically connected to the touch sensitive device (100). Specifically, the touch panel (230) may be electrically connected to the electrode of the touch sensitive device (100) and various touch signals input through the touch panel (230). Alternatively, a voltage may be delivered to the touch sensitive device (100).

The upper cover (240) is disposed on the touch panel (230) in order to cover the upper part of the touch sensitive device (100), the display panel (220), and the touch panel (230). The upper cover (240) can have the same function of the lower cover (210). In addition, the upper cover (240) maybe composed of the same material as the lower cover (210).

In addition, the display device (200) requires a low driving voltage and has an excellent light transmittance by using the electroactive film (110) that has an excellent light transmittance and an excellent dielectric constant, and thus, may be disposed in the front of the display panel. This allows for the display device (200) to deliver a direct sense of touch and feedback to the user.

Figure 4:
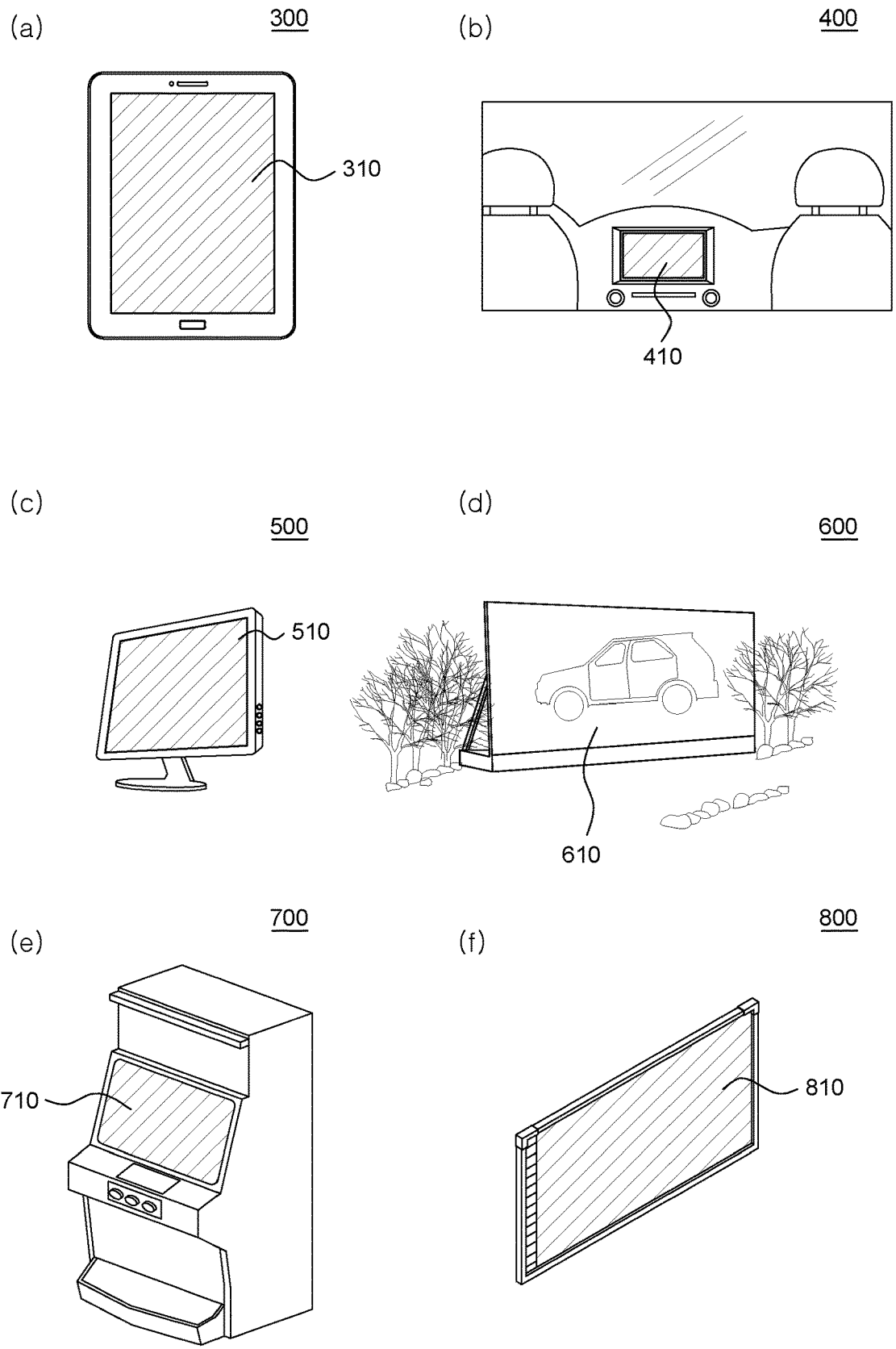
FIG. 4 including (a) to (f) shows diagrams illustrating practical examples in which display devices according to various embodiments of the present disclosure may be advantageously utilized.

FIG. 4 including (a) to (f) shows diagrams illustrating practical examples in which the display device according to various embodiments of the present disclosure may be advantageously utilized.

FIG. 4(a) is an exemplary external view of a mobile display device (300) including the touch sensitive device according to an embodiment of the present disclosure. Examples of the mobile display device may include a miniaturized device such as a smartphone, a mobile phone, a tablet PC, and PDA. When the touch sensitive device of the present disclosure is installed to the mobile display device (300), it is possible to directly deliver the vibrations corresponding to the strengths of touch including a fine difference in touch to the user, and a stronger sense of touch may also be delivered. The user can feel the vibration together with touch at the time of watching videos and games. Accordingly, a button input, and the like, using the mobile display device (300) can receive more synesthetic information from the mobile display device (300).

FIG. 4(b) is an exemplary external view of a vehicle navigation (400) including the touch sensitive device according to an embodiment of the present disclosure. The vehicle navigation (400) may include a display device and a plurality of operating elements and may be controlled by a processor installed in the inside of the vehicle. When the display device of the present disclosure is utilized in the vehicle navigation (400), it is possible to provide the height of the road, the state of the road, the progress of the vehicle, and the like, to the user through tactile sensation.

FIG. 4(c) is an exemplary external view of a television (500) including the touch sensitive device according to an embodiment of the present disclosure. When the display device of the present disclosure is used in the television (500) or a display device such as a monitor, the user can feel the texture of a specific article, the state of the speaker, and the like, as the user actually experiences through the display device, and thus, can enjoy more realistic images.

FIG. 4(d) is an exemplary external view of an outdoor billboard (600) including the touch sensitive device according to an embodiment of the present disclosure. When the display device of the present disclosure is utilized in the outdoor billboard (600), it is possible to directly deliver the tactile information on the advertising goods to be sold to the user, and thus, it is possible to maximize the advertising effect.

FIG. 4(e) is an exemplary external view of a slot machine (700) including the touch sensitive device according to an embodiment of the present disclosure. The slot machine (700) may include a display device and a housing equipped with a variety of processors. When the display device of the present disclosure is utilized in the slot machine (700), the image is directly operated, thus it is possible to provide a realistic lever pull, rotation of the roulette wheel, movement of the roulette ball, and the like, and it is possible to enhance the engagement of the game.

FIG. 4(f) is an exemplary external view of an electronic bulletin board (800) including the touch sensitive device according to an embodiment of the present disclosure. The electronic bulletin board (800) may include a display device, a speaker, and a structure to protect these components from external impact. When the display device of the present disclosure is utilized in the electronic bulletin board (800), it is possible to provide the feeling of directly writing the lecture content on the chalkboard to the educator when the educator inputs lecture content into the display device with a stylus pen or a finger. In addition, when the trainee permits the touch input of the image displayed on the electronic bulletin board (800), appropriate tactile feedback for the image can be provided to the trainee, and thus, the effect of training can be maximized.

Figure 5A:
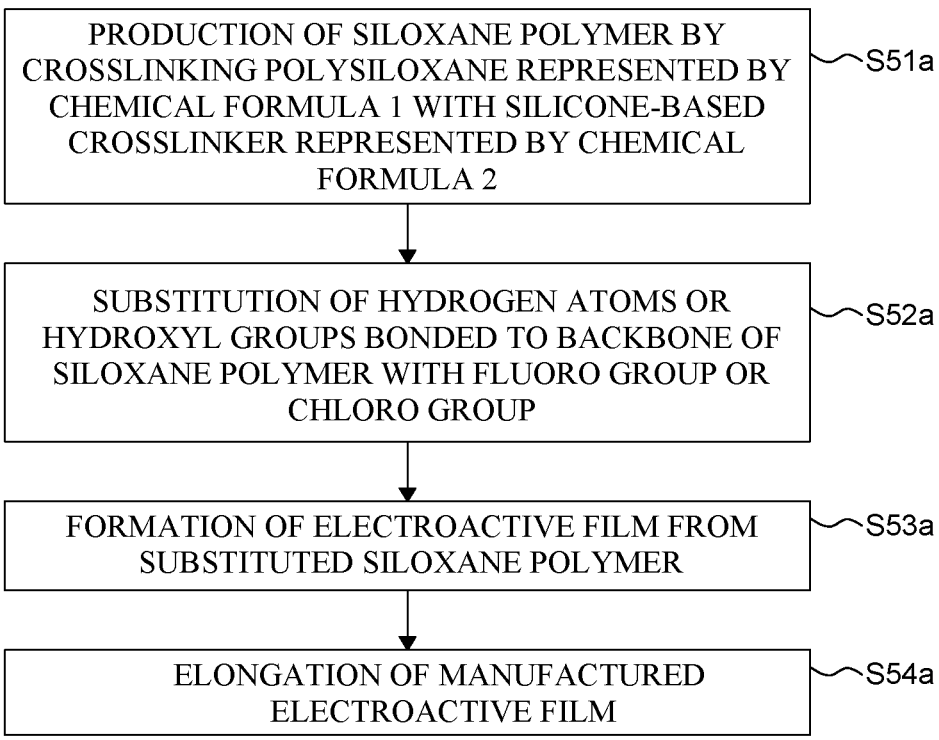
FIGS. 5A and 5B are flowcharts illustrating a method of manufacturing an electroactive film according to various embodiments of the present disclosure.
Figure 5B:
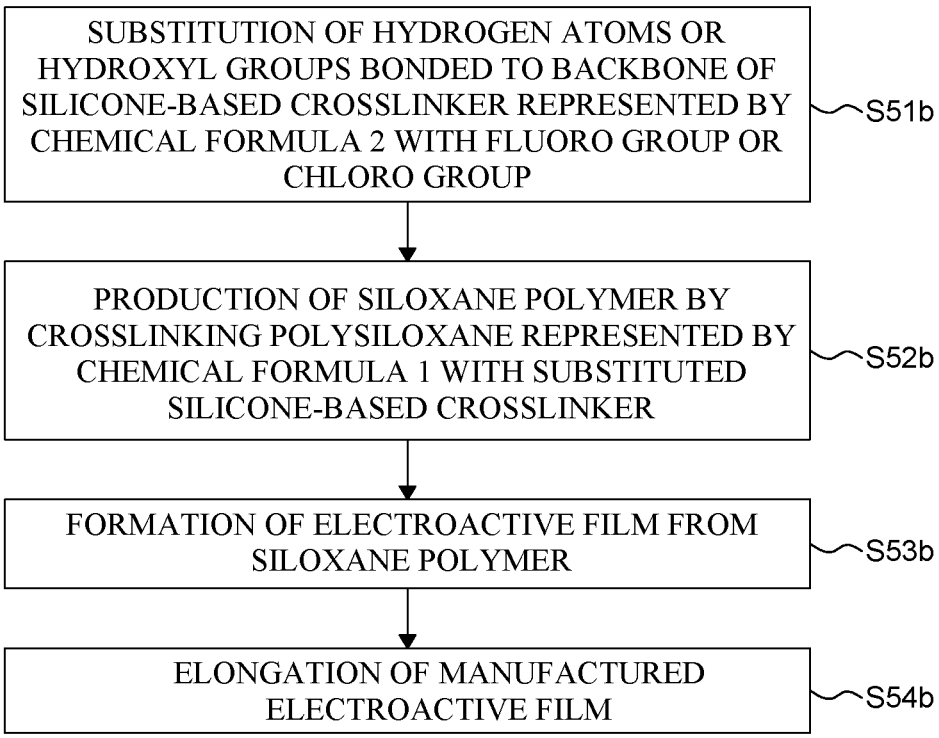

FIGS. 5A and 5B are flowcharts illustrating the method of manufacturing an electroactive film composed of a siloxane polymer having a fluoro group or a chloro group bonded to a part of the backbone according to various embodiments of the present disclosure.

The method of manufacturing an electroactive film of the present disclosure varies depending on the method of producing a siloxane polymer including a halogen atom, and thus, two methods will be explained in accordance with the methods of producing the siloxane polymer as described below.

Specifically, the method of manufacturing an electroactive film according to procedure (a) of FIG. 5 (i.e., FIG. 5A) includes producing a siloxane polymer by crosslinking a polysiloxane having terminals substituted with a vinyl group with a silicon-based crosslinker including Si—H or Si—OH in the backbone, and then substituting Si—H or Si—OH remaining in the repeating unit derived from the silicon-based crosslinker with a fluoro group or a chloro group.

First, a siloxane polymer is produced by crosslinking a polysiloxane represented by the following Chemical Formula 1 with a silicon-based crosslinker represented by the following Chemical Formula 2 (S51a).

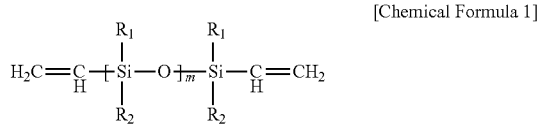

[Chemical Formula 1]

In Chemical Formula 1, $R_1$ and $R_2$ is each independently a $C_1$ to $C_{20}$ alkyl group, a $C_1$ to $C_{20}$ aryl group, a $C_1$ to $C_{20}$ cycloalkyl group or a hydrogen atom, and m is an integer of 1 or more. In Chemical Formula 1, $R_1$ and $R_2$ are preferably a $C_1$ to $C_{20}$ alkyl group and more preferably a methyl group, m is preferably an integer from 50 to 500, but they are not limited thereto.

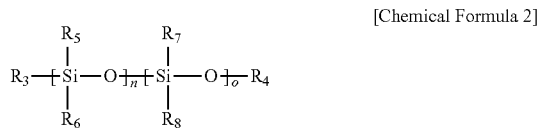

[Chemical Formula 2]

In Chemical Formula 2, $R_3$ to $R_7$ is each independently a $C_1$ to $C_{20}$ alkyl group, a $C_1$ to $C_{20}$ aryl group, a $C_1$ to $C_{20}$ cycloalkyl group or a hydrogen atom, $R_8$ is a hydrogen atom or a hydroxyl group, n is 0 or an integer of 1 or more, and o is an integer of 2 or more. It is preferable that n is 0 and o is an integer from 10 to 100, but they are not limited thereto.

The polysiloxane represented by Chemical Formula 1 is a polysiloxane that has terminals substituted with a vinyl group, and the silicon-based crosslinker represented by Chemical Formula 2 is a chain-type silicon-based crosslinker including Si—H or Si—OH in the backbone. Chemical Formula 1 may be obtained by substituting the terminals of polydimethylsiloxane (PDMS) with a vinyl group. Also, polyhydrogenmethylsiloxane (PHMS) that has terminals substituted with trimethylsilane may be used as the crosslinker represented by Chemical Formula 2, but they are not limited thereto.

In producing a siloxane polymer (S51a), benzene, toluene, n-heptane, ether, xylene, triethylamine, diisopropylamine or the like may be used as the organic solvent, and producing a siloxane polymer may be carried out at from 50° C. to 80° C. for 1 hour to 48 hours.

Producing a siloxane polymer (S51a) may be carried out in the presence of a platinum-based catalyst, and the platinum-based catalyst is not particularly limited but may include, for example, $Pt[(CH_2=CH—SiMe_2)_2O]_{1.5}$ of the Carstedt's catalyst, $Pt[(C_2H_4)Cl_2]_2$ of a Zeise's salt dimmer or the like. Such a catalyst may be used in a content of from 0.01 mol% to 1 mol% with respect to 1 mol of the reactant.

The volume ratio of the polysiloxane represented by Chemical Formula 1 to the crosslinker represented by Chemical Formula 2 to be crosslinked is preferably from 9:1 to 5:5, and more preferably from 8:2 to 6:4. Sufficient crosslinking does not proceed when the volume of the silicon-based crosslinker represented by Chemical Formula 2 is less than the above range, and the hardness of the siloxane polymer produced excessively increases when the volume exceeds the above range. Thus, the siloxane polymer produced in this manner may be inappropriate for use as a touch sensitive device.

In producing a siloxane polymer (S51a), the double bond of the vinyl group present in the terminal of the polysiloxane represented by Chemical Formula 1 is broken and the carbon atoms of the vinyl groups bond with some hydrogen atoms of Si—H or some hydroxyl groups of Si—OH present in the backbone of the silicon-based crosslinker represented by Chemical Formula 2. In other words, the carbon atom of the vinyl group does not react with the substituents of $R_5$ to $R_7$ in the silicon-based crosslinker represented by Chemical Formula 2, but reacts with the hydrogen atom or the hydroxyl group of $R_8$ to form a crosslink.

The siloxane polymer that is the product of such a crosslinking reaction forms a network structure as described above.

Next, some hydrogen atoms or hydroxyl groups bonded to the backbone of the siloxane polymer produced in the process of producing a siloxane polymer (S51a) are substituted with a fluoro group or a chloro group (S52a).

In substituting with a fluoro group or a chloro group (S52a), some hydrogen atoms of Si—H or hydroxyl groups of Si—OH present in the backbone of the siloxane polymer produced in the process of producing a siloxane polymer (S51a) are substituted with a fluoro group or a chloro group. More specifically, substituting with a fluoro group or a chloro group (S52a) refers to the substitution of some hydrogen atoms of Si—H or hydroxyl groups of Si—OH present in the repeating unit derived from the silicon-based crosslinker represented by Chemical Formula 2 with a fluoro group or a chloro group. In other words, any remaining hydrogen atoms or hydroxyl groups in $R_8$ of Chemical Formula 2 after the reaction with the vinyl group present in the terminal of the polysiloxane represented by Chemical Formula 1 in the process of producing a siloxane polymer (S51a) are substituted with a fluoro group or a chloro group.

Si—H or Si—OH may be substituted with Si—F or Si—Cl by reacting the siloxane polymer produced in producing a siloxane polymer (S51a) in an aqueous solution of hydrogen fluoride (HF) or hydrogen chloride (HCl), or by injecting $Cl_2$ gas and $F_2$ gas to the siloxane polymer and reacting them, but it is not limited thereto.

Next, the substituted siloxane polymer is formed into an electroactive film (S53a).

The substituted siloxane polymer may be formed into a film on various substrates such as glass, ITO, and a plastic using a coating method such as spin coating, dip coating, solvent casting, slit coating, or bar coating or a co-extrusion method, but it is not limited thereto.

Next, the present disclosure may further include elongation of the manufactured electroactive film (S54a).

Elongating the electroactive film (S54a) converts an α-phase to a β-phase and is carried out by stretching the electroactive film manufactured in S53a in a specific direction. The elongation method is briefly divided into a wet elongation method and a dry elongation method. The dry elongation method is divided into an interroll elongation method, a heating roll elongation method, a compressive elongation method, and a tenter elongation method. The wet elongation method is divided into a tenter elongation method and an interroll elongation method. In the present disclosure, both the wet elongation method and the dry elongation method may be used, and these may be used in combination if necessary.

The electroactive film may be uniaxially elongated in the MD direction (longitudinal direction) or the TD direction (width direction) or biaxially elongated and sequentially or simultaneously elongated, if necessary.

In elongating the electroactive film (S54a), the electroactive film is preferably elongated at an elongation rate of from 100% to 500%. This elongation rate is advantageous because the electroactive film may not be completely converted to a β-phase when the elongation rate is less than 100%, and the film may be fractured or a sufficient thickness maybe not be completely secured when the elongation rate exceeds 500%.

The electroactive film may be subjected to heat treatment (annealing) after the elongation process in order to stabilize the optical properties and mechanical properties thereof. The heat treatment conditions are not particularly limited and may include any conditions known in the art.

Next, the method of manufacturing an electroactive film according to procedure (b) of FIG. 5 (i.e., FIG. 5B) includes first substituting a silicon-based crosslinker having Si—H or Si—OH in the backbone with a fluoro group or a chloro group, and then crosslinking a polysiloxane having terminals substituted with a vinyl group with the substituted silicon-based crosslinker to produce a siloxane polymer.

As illustrated in procedure (b) of FIG. 5, first, some hydrogen atoms or hydroxyl groups bonded to the backbone of the silicon-based crosslinker represented by Chemical Formula 2 are substituted with a fluoro group or a chloro group (S51b).

Procedure (b) of FIG. 5 is different from procedure (a) of FIG. 5 in that some hydrogen atoms or hydroxyl groups bonded to the backbone of the silicon-based crosslinker represented by Chemical Formula 2 are substituted with a fluoro group or a chloro group before a polysiloxane represented by Chemical Formula 1 is crosslinked with the silicon-based crosslinker represented by Chemical Formula 2. In other words, some hydrogen atoms or hydroxyl groups of $R_8$ in Chemical Formula 2 are substituted with a fluoro group or a chloro group.

Si—H or Si—OH may be substituted with Si—F or Si—Cl by reacting the silicon-based crosslinker represented by Chemical Formula 2 in an aqueous solution of hydrogen fluoride (HF), hydrogen chloride (HCl) or by injecting $Cl_2$ gas and $F_2$ gas to the silicon-based crosslinker, but it is not limited thereto.

Next, a siloxane polymer is produced by crosslinking the crosslinker substituted with a polysiloxane represented by Chemical Formula 1 (S52b).

The method to crosslink the silicon-based crosslinker substituted with a fluoro group or a chloro group with a polysiloxane represented by Chemical Formula 1 is substantially the same as S52a described in procedure (a) of FIG. 5, and thus, the description will be omitted.

Next, the siloxane polymer is formed into an electroactive film (S53b). In addition, elongation of the manufactured electroactive film may be further included (S54b).

Forming an electroactive film and elongating the electroactive film manufactured are substantially the same as S53a and S54a described in procedure (a) of FIG. 5, respectively. Thus, the description will be omitted.

Hereinafter, the production of the siloxane polymer and an electroactive film comprising the siloxane polymer will be explained in more detail through the Examples.

EXAMPLES

Production Example

Production of Siloxane Polymer Having a Fluoro Group Bonded to Backbone

In 100 ml of toluene solvent, 10 g of polyhydrogenmethylsiloxane (PHMS, weight average molecular weight: 3000) as a silicon-based crosslinker was dispersed. 30 ml of HF having a concentration of 1 molal was then added thereto at 60° C. to 80° C., and the mixture was treated for 3 hours to produce polyhydrogenmethylsiloxane having fluoro (F) bonded to the backbone. Thereafter, polydimethylsiloxane (PDMS, weight average molecular weight: about 40,000) having terminals substituted with a vinyl group was mixed with the produced polyhydrogenmethylsiloxane having fluoro (F) bonded to a part of the backbone at a volume ratio of 7:3 to produce a siloxane polymer.

Example 1

The siloxane polymer produced in the Production Example was coated on a glass substrate by a bar coating method and then treated for 2 hours at 60° C., to manufacture an electroactive film composed of a siloxane polymer. The siloxane polymer was not elongated.

Example 2

A non-elongated electroactive film was manufactured in the same manner as in Example 1, except that the siloxane polymer was produced by mixing polydimethylsiloxane (PDMS, weight average molecular weight: about 40,000) having terminals substituted with a vinyl group and the produced polyhydrogenmethylsiloxane having fluoro (F) bonded to a part of the backbone at a volume ratio of 9:1.

Comparative Example 1

A non-elongated electroactive film was obtained by coating polydimethylsiloxane (PDMS) as a dielectric elastomer on a substrate and then drying, instead of the electroactive film of Example 1.

Comparative Example 2

A non-elongated electroactive film was manufactured from a polydimethylsiloxane-based polymer (trade name: Dow 730, Dow Corning Corporation) represented by the following Chemical Formula 4, instead of the siloxane polymer produced by the Production Example and using a bar coating method.

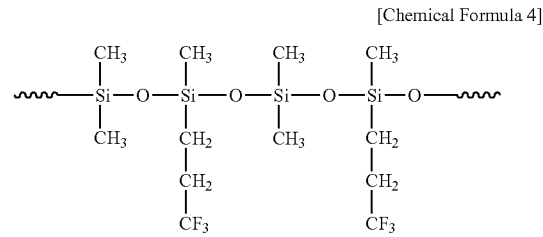

[Chemical Formula 4]

Comparative Example 3

An electroactive film composed of P(VDF-TrFE) (Poly (VinyliDene Fluoride)-TriFluoroEtylene) of a ferroelectric polymer was prepared, instead of the electroactive film of Example 1.

Experimental Example 1

Measurement of Dielectric Constant and Measurement of Change in Dielectric Constant in Accordance with Elongation The dielectric constant of the electroactive films of Examples 1 and 2 and Comparative Examples 1 and 2 was determined by measuring the capacitance at a frequency of 1 kHz and 25° C. using an LCR meter (4284A) and calculating using Equation (1).

$$\varepsilon = C \times t / \varepsilon_o \times A \quad \text{[Equation 1]}$$

(ε: dielectric constant, C: capacitance, $\varepsilon_o$: dielectric constant in vacuum, t: thickness of electroactive film, and A: contact cross-sectional area of electrode)

Meanwhile, the electroactive films of Examples 1 and 2 and Comparative Examples 1 and 2 were uniaxially elongated in the MD direction (longitudinal direction) at an elongation rate of 100%, 300%, and 400%, respectively, using the interroll elongation method. The dielectric constant and the rate of change in dielectric constant of the respective elongated electroactive films were then measured. The measurement results are presented in the following Table 1.

TABLE 1

| Division | Non-elongated Dielectric constant | Elongation rate: 100% | | Elongation rate: 300% | | Elongation rate: 400% | |
|---|---|---|---|---|---|---|---|
| | | Dielectric constant | Change in dielectric constant | Dielectric constant | Change in dielectric constant | Dielectric constant | Change in dielectric constant |
| Example 1 | 6.8 | 9.5 | 39.7% | 10.2 | 50% | 10.5 | 54.4% |
| Example 2 | 6.0 | 7.1 | 18.3% | 8.4 | 40% | 8.4 | 40% |
| Comparative Example 1 | 2.7 | 2.6 | 3.7% | 2.7 | 0% | 2.7 | 0% |
| Comparative Example 2 | 5.5 | 5.5 | 0% | 5.6 | 1.8% | 6.2 | 12% |

As shown in Table 1, the electroactive films of Examples 1 and 2 have a much higher dielectric constant compared to that of polydimethylsiloxane (PDMS), which has been conventionally used as a dielectric elastomer. In addition, it has been confirmed that the electroactive film composed of the siloxane polymer of the present disclosure has a dielectric constant that is improved by 30% or more after elongation at an elongation rate of 100% or more compared to the dielectric constant before elongation and improved by 40% or more after elongation at an elongation rate of 300% or more compared to the dielectric constant before elongation. In addition, it has been confirmed that it is possible to achieve a high dielectric constant in which a conventional polysiloxane does not possess.

On the other hand, as shown in Comparative Example 1, the dielectric constant of the electroactive film composed of polydimethylsiloxane (PDMS) is not improved by elongation.

In addition, the dielectric constant of the electroactive film of Comparative Example 2 is higher than that of Comparative Example 1. However, the dielectric constant of the electroactive film of Comparative Example 2 is lower than that of Example 1 when compared to Example 1 and Comparative Example 1. In addition, it has been confirmed that the effect of elongation to improve the dielectric constant as in Example 1 is insufficient in the electroactive film of Comparative Example 2. This difference is caused by differences in polymer structure between the electroactive film of Comparative Example 2 and the electroactive film of Example 1. As shown in Chemical Formula 4, the electroactive film of Comparative Example 2 is similar to the electroactive film of Example 1 in that the electroactive film is composed of a polydimethylsiloxane-based polymer having a fluoro group. However, the electroactive film of Comparative Example 2 is different from the electroactive film of Example 1 in that the fluoro group is bonded to the side chain in Comparative Example 2, while the fluoro group is directly bonded to the backbone in Example 1. Consequently, it is difficult to expect the effect that the fluoro groups are arranged in the same direction by elongation from the electroactive film of Comparative Example 2, unlike the electroactive film of Example 1. Thus, the intensity of polarization and the dielectric constant of the electroactive film of Comparative Example 2 are not as improved as those of Example 1.

Experimental Example 2

Measurement of Light Transmittance

The light transmittance of the electroactive films of Examples 1 and 2 and Comparative Examples 1 and 3 was measured using a haze meter (JCH-300S, Ocean Optics, Inc.). The measurement results are presented in the following Table 2.

TABLE 2

| division | Light transmittance |
|---|---|
| Example 1 | 90% |
| Example 2 | 91% |
| Comparative Example 1 | 89.8% |
| Comparative Example 3 | 75% |

As shown in Table 2, the electroactive films of Examples 1 and 2 are superior to a ferroelectric polymer in light transmittance. Also, the dielectric constant thereof is significantly improved compared to a conventional dielectric elastomer. Accordingly, the electroactive film of the present disclosure has a significantly improved dielectric constant while simultaneously having a light transmittance as good as a dielectric elastomer, and thus, may be disposed on the display panel. Consequently, the touch sensitive device including the electroactive film of the present disclosure can provide direct and various tactile feedback to the user.

Experimental Example 3

Evaluation on Performance of Touch Sensitive Device

Figure 6A:
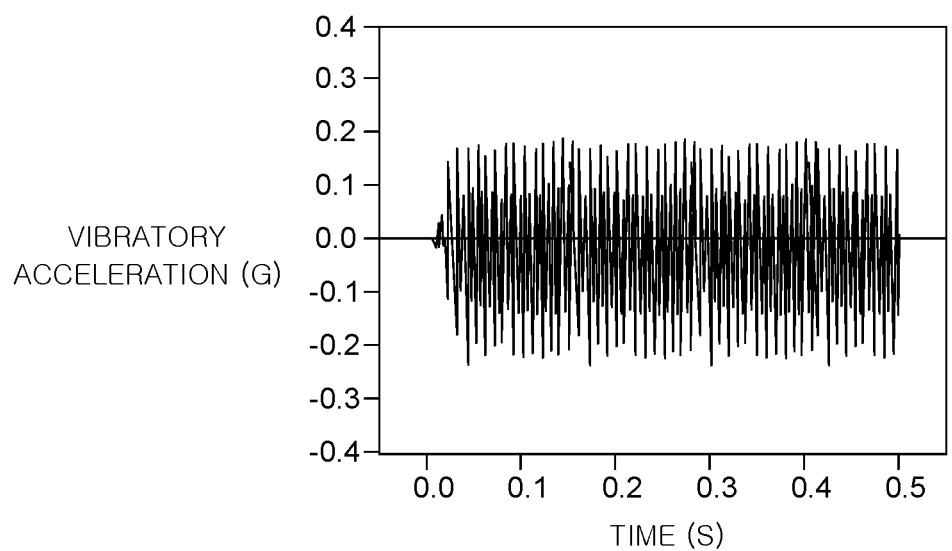
FIGS. 6A to 6C are graphs illustrating the vibratory acceleration measured when a voltage of 2 kVpp is applied to touch sensitive devices including an electroactive film according to Example 1 and Comparative Example 1.
Figure 6B:
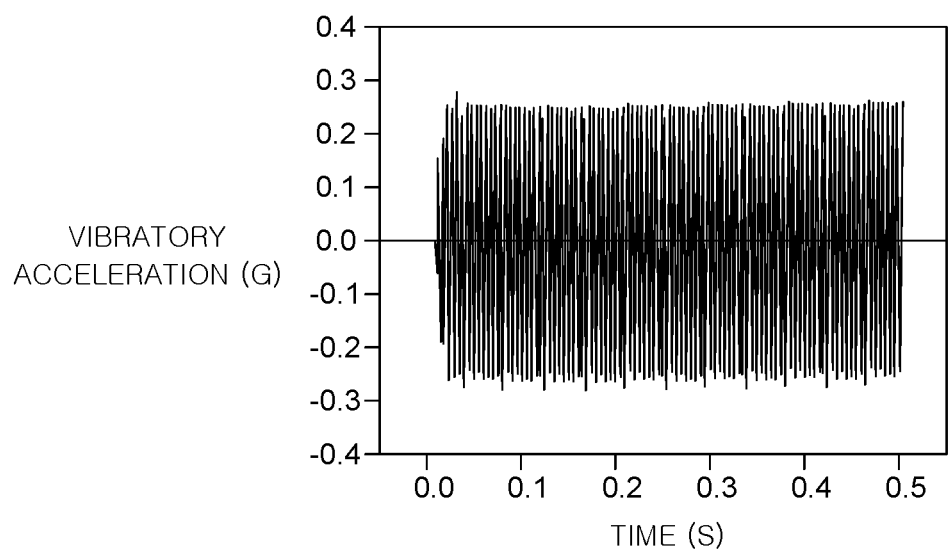
Figure 6C:
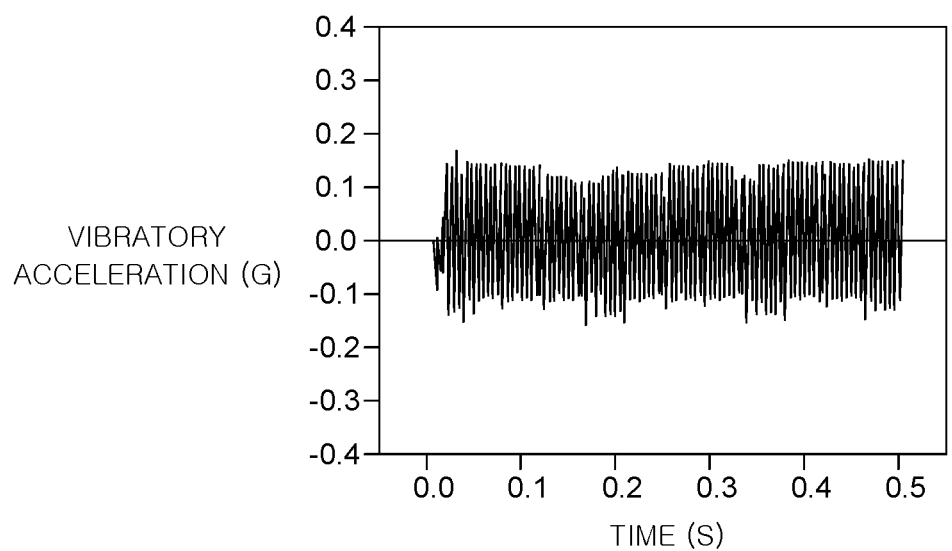

The vibratory acceleration was measured in order to evaluate the performance of the touch sensitive device including the electroactive film of the present disclosure. FIGS. 6A to 6C are the experimental data on the vibratory acceleration for Example 1 and Comparative Example 1. Specifically, FIG. 6A is a graph illustrating the vibratory acceleration measured when a voltage of 2 kVpp is applied to the touch sensitive device including the non-elongated electroactive film manufactured in Example 1. FIG. 6B is a graph illustrating the vibratory acceleration measured when a voltage of 2 kVpp is applied to the touch sensitive device including the electroactive film obtained by elongating the electroactive film manufactured in Example 1 in the MD direction (longitudinal direction) at an elongation rate of 300% using an interroll elongation method. In addition, FIG. 6C is a graph illustrating the vibratory acceleration measured when a voltage of 2 kVpp is applied to the touch sensitive device of Comparative Example 1.

As illustrated in FIG. 6C, a vibratory acceleration of 0.11 G is generated at actuation when applying a voltage of 2 kVpp to the touch sensitive device of Comparative Example 1. As illustrated in FIG. 6A, a vibratory acceleration of 0.16 G is generated at actuation when applying a voltage of 2 kVpp to the touch sensitive device including the non-elongated electroactive film manufactured in Example 1, and thus, it is confirmed that the vibratory acceleration of Example 1 has increased compared to that of Comparative Example 1. In addition, as illustrated in FIG. 6B, a vibratory acceleration of 0.24 G is generated when applying a voltage of 2 kVpp to the touch sensitive device including the elongated electroactive film, and thus, it is confirmed that the vibratory acceleration has significantly increased.

The present disclosure has been described in more detail with reference to the exemplary embodiments, but the present disclosure is not limited to the exemplary embodiments. It will be apparent to those skilled in the art that various modifications can be made without departing from the technical sprit of the disclosure. Accordingly, the exemplary embodiments disclosed in the present disclosure are used not to limit but to describe the technical spirit of the present disclosure, and the technical spirit of the present disclosure is not limited to the exemplary embodiments. Therefore, the exemplary embodiments described above are considered in all respects to be illustrative and not restrictive. The protection scope of the present disclosure must be interpreted by the appended claims and it should be interpreted that all technical spirits within a scope equivalent thereto are included in the appended claims of the present disclosure.

What is claimed is:

1. A touch sensitive device comprising:
   an electroactive film comprising a siloxane polymer formed from crosslinking a polysiloxane represented by Chemical Formula 1 with a silicon-based crosslinker represented by Chemical Formula 2,
   wherein the polysiloxane represented by Chemical Formula 1 has terminal vinyl groups, and wherein the terminal vinyl groups react with a Si—H or a Si—OH present in the silicon-based crosslinker of Chemical Formula 2 to be crosslinked,
   wherein the silicon-based crosslinker represented by Chemical Formula 2 forms ferroelectric polymer regions in the siloxane polymer
   wherein the polysiloxane represented by Chemical Formula 1 forms dielectric elastomer regions in the siloxane polymer,
   wherein the ferroelectric polymer regions and the dielectric elastomer regions are alternatively stacked layer by layer in a multilayer structure when the electroactive film is elongated,
   wherein the electroactive film has a dielectric constant that increases 15% to 54.4% when the electroactive film is uniaxially or biaxially elongated at an elongation rate of 100% to 400% at 60° C. to 80° C., as compared to a dielectric constant before the electroactive film is elongated;

[Chemical Formula 1]

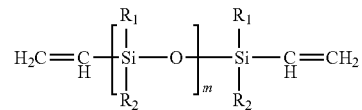

wherein in Chemical Formula 1, $R_1$ and $R_2$ is each independently a $C_1$ to $C_{20}$ alkyl group, a $C_1$ to $C_{20}$ aryl group, a $C_1$ to $C_{20}$ cycloalkyl group or a hydrogen atom, and m is an integer of 1 or more,

[Chemical Formula 2]

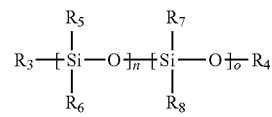

wherein in Chemical Formula 2, $R_3$ to $R_7$ is each independently a $C_1$ to $C_{20}$ alkyl group, a $C_1$ to $C_{20}$ aryl group, a $C_1$ to $C_{20}$ cycloalkyl group or a hydrogen atom, $R_8$ is a hydrogen atom or a hydroxyl group, n is 0 or an integer of 1 or more, and o is an integer of 2 or more, and further wherein (i) in Chemical Formula 2, one or more of $R_7$ and $R_8$ is each independently substituted with a fluoro group or a chloro group prior to crosslinking, or (ii) wherein after the siloxane polymer is formed from crosslinking the polysiloxane represented by Chemical Formula 1 with the silicon-based crosslinker represented by Chemical Formula 2, some hydrogen atoms of a Si—H group or some hydroxyl groups of a Si—OH group present in a backbone of a repeating unit derived from the silicone-based crosslinker represented by Chemical Formula 2 are substituted with a fluoro group or a chloro group.

2. The touch sensitive device according to claim 1, wherein the electroactive film has a dielectric constant that is improved by 30% to 54.4% by elongation at an elongation rate of 300% to 400%.

3. The touch sensitive device according to claim 1, wherein the electroactive film has a β-phase structure.

4. The touch sensitive device according to claim 1, wherein the electroactive film has a dielectric constant measured at 1 kHz of 7.0 or more before the electroactive film is elongated.

5. The touch sensitive device according to claim 1, wherein the electroactive film has a light transmittance of 85% or more before the electroactive film is elongated.

6. The touch sensitive device according to claim 1, wherein all of the repeating units having the fluoro group or the chloro group are arranged in a same direction, when the electroactive film is elongated.

* * * * *